June 30, 1970     TOYOMASA MINEGISHI     3,517,814

HIGH SPEED WATER PURIFYING APPARATUS

Filed June 17, 1968

INVENTOR.
TOYOMASA MINEGISHI
BY
Woodhams, Blanchard & Flynn
ATTORNEYS

United States Patent Office 3,517,814
Patented June 30, 1970

3,517,814
HIGH SPEED WATER PURIFYING APPARATUS
Toyomasa Minegishi, 4–31–8 Honkomagome,
Bunkyo-ku, Tokyo, Japan
Filed June 17, 1968, Ser. No. 737,693
Int. Cl. B01d 21/26, 21/24
U.S. Cl. 210—197                                8 Claims

ABSTRACT OF THE DISCLOSURE

A process and apparatus for treating liquids by developing rotating rising currents without the use of any mechanical agitator. The rotating and rising currents are developed within a coagulating reaction chamber whereby the coagulating flocks float upwardly. At the same time the flocks are separated and removed from the center region and the periphery of the coagulating reaction chamber by the action of centripetal and centrifugal force, respectively.

FIELD OF THE INVENTION

This invention relates to a high speed water purifying apparatus adapted particularly to such water treatments as the purification of drinking water, sewage, industrial water and factory waste and the disposal of sewage.

DESCRIPTION OF THE PRIOR ART

There are already known various types of treating apparatus for such water treatments as are mentioned above. As processes, there are known a coagulating-precipitating process, a floating-up process, an evaporating condensing process, a filtering process and an ion exchanging process. Among them, the coagulating-precipitating process has been already most extensively generalized and utilized and various coagulating-precipitating apparatuses are known.

However, in the conventional coagulating-precipitating apparatus using chemicals, purified water is obtained by adding an electrolyte proper as a coagulant to a crude liquid to be treated so that colloid fine particles suspended therein may be coagulated by a coagulating chemical reaction to form flocks and then the flocks are precipitated and removed. In such apparatuses, the weight of the formed coagulated flocks will control the settling velocity and will therefore determine the size, surface area and volume of the apparatus, that is, the performance and efficiency of the apparatus. Therefore, it is necessary to make the formed flocks heavy by all means. Therefore, in the prior art techniques there have been disadvantages which have made it necessary to use a special high molecular weight coagulant and a coagulating assistant with a resultant increase in the consumption of chemicals. Also, these prior techniques generally have a water purifying capacity which is insufficient or the apparatus is so large that various auxiliary devices, such as a mechanical agitator, must be additionally provided such that the operation is extremely complicated.

As a result of extensive research, the present inventor has developed a process and apparatus for obtaining clear water wherein rotating rising currents are produced without using any mechanical agitator or the like in a coagulating reaction separating chamber so that coagulated flocks may float up and at the same time the flocks are separated and removed from the center and periphery of the coagulating reaction separating chamber by the action of the centrifugal force and/or centripetal force of the rotating rising currents. According to the present invention, quite irrespective of the settling velocity of flocks, if only the flocks are formed, they will be separated perfectly at a high speed from the treated water by the centrifugal force and/or centripetal force produced by the rising rotating currents within the apparatus so that purified water may be obtained.

The present invention shall be explained with reference to the accompanying drawings illustrating a preferred embodiment of the apparatus of the present invention.

SUMMARY OF THE INVENTION

The present invention relates to a process and an apparatus for treating liquids, in particular for treating and purifying water. The apparatus comprises a large cylindrical outer tank which defines a coagulating reaction chamber and in which is positioned a flow nozzle adjacent the lower portion thereof. The flow nozzle causes the crude liquid supplied to the apparatus to develop a rotating and rising flow pattern within the outer tank. The coagulated flocks float upwardly through the chamber and at the same time rotate circumferentially around the chamber whereupon the flocks of heavier suspended particles are separated adjacent the upper periphery of the chamber due to centrifugal force, while the lighter flocks or suspended particles are separated and removed from the liquid adjacent the center of the upper portion of the chamber due to centripetal force. Separate passageways are provided for connecting the respective upper peripheral and central portions of the reaction chamber with a sludge chamber provided adjacent the bottom of the tank.

DETAILED DESCRIPTION

Figure 1:
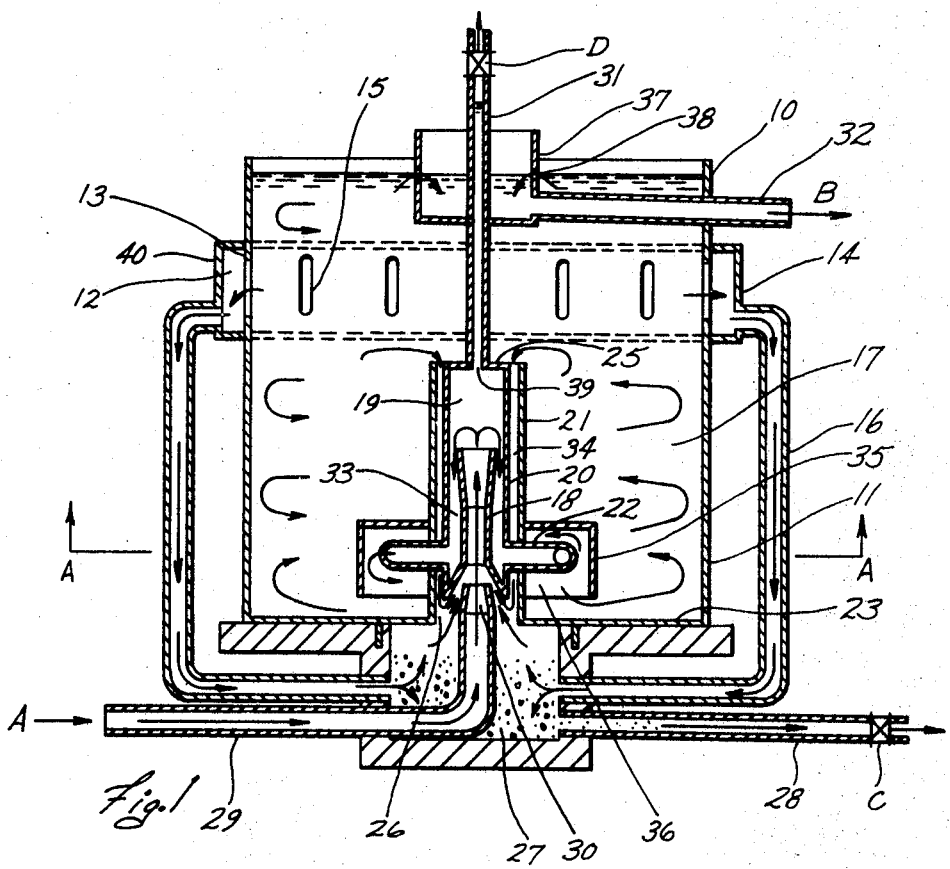
FIG. 1 is a vertical sectional view of a high speed water purifying apparatus embodying the present invention.
Figure 2:
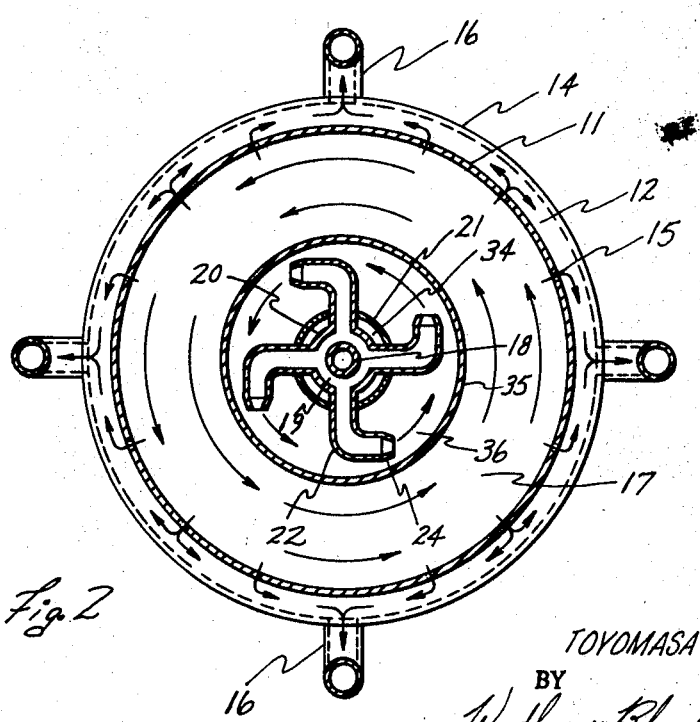
FIG. 2 is a cross-sectioned view taken on line A—A in FIG. 1.

In FIG. 1, a vertical cylindrical coagulating reaction separating tower body 10 is filled with a liquid to be treated. A sludge settling chamber 27 is provided adjacent the lowermost part of said body 10. The chamber 27 has an opening 26 in the center and is separated from a coagulating reaction chamber 17 above it by a partition wall plate 23 fixed on the peripheral edge to the inside wall of the body 10. A cylinder 21 is provided upright in the center of the interior of the body 10 and is fixed on the bottom peripheral edge to the peripheral edge of the opening 26 of the partition wall plate 23. Within the cylinder 21 there is provided an inner upright cylinder 20 of substantially the same height as of the cylinder 21 so as to be concentrical with it. There is further provided inside and below said cylinder 20 a jet diffuser 18 having the same concentric cylindrical form, expanded to be in the form of a truncated cone in the radial direction in the bottom part, jointed and fixed on the bottom peripheral edge to the bottom peripheral edge of the inner cylinder 20 and opened in the bottom part to the upper part of the sludge settling chamber 27.

A clearance 34 is provided between the cylinder 21 and the inner cylinder 20 so as to form an internal downward flow passage. Further, a clearance 33 is provided between the inner cylinder 20 and the jet diffuser 18. The inner cylinder 20 is closed in the top part by a wall 25 in which is formed an opening 39 connected with an air exhausting pipe 31. The inner cylinder 20 is fixed on the lower end to the lower end peripheral edge of the jet diffuser 18 as mentioned above so as to form a quick agitating chamber 19. An air exhausting pipe 31 is extended upward out of the body 10 and is provided with an air exhausting port valve D in the air exhausting port at its tip.

The jet diffuser 18 opens at the upper end in the lower half part of the chamber 19 and has around it the passage 33 to lead a reaction product downward. Further, several L-shaped jetting tubes 22 having respective nozzles 24 bent in the same direction at the tips are opened at the inner ends in the bottom part of the peripheral wall of the inner cylinder 20. These tubes 22 extend horizontally through the wall of the cylinder 21 and open into a quick rotating chamber 36 formed of a cylindrical wall 35 fixed along and concentrically with the outer periphery of the cylinder 21 and opening downward. Thus the quick agitating chamber 19 and the sludge settling chamber 27 are vertically connected with each other through the jet diffuser 18 and the lower part of the coagulating reaction chamber 17 formed between the cylinder 21 and body 10 and the sludge settling chamber 27 are vertically connected with each other through the internal downward flow passage 34.

A crude water inlet pipe 29 is extended through the side wall of the sludge settling chamber 27 from outside, is opened upward at the inner end in the opening at the lower end of the jet diffuser 18 and is provided at the tip with an inflow water accelerating nozzle 30. Further, the body 10 has a concentric enlarged cylindrical part 40 enlarged in diameter over some length on the body 10 in the middle part above the coagulating reaction chamber 17. Inside this enlarged part 40 is a cylindrical inner wall 13 having the same diameter as and extending integrally upward from the lower peripheral wall 11 of the body 10. The inner wall 13 and the cylindrical outer wall 14 of the enlarged cylindrical part 40 define a hollow cylindrical flock separating chamber 12 between them. The cylindrical inner wall 13 is provided with vertically long and narrow flow slots 15 at regular intervals in the peripheral direction so that the coagulating reaction chamber 17 and the flock separating chamber 12 may be connected with each other.

The flock separating chamber 12 and the sludge settling chamber 27 are connected with each other through several external downward flow pipes 16. Further, a purified water collecting chamber or box 37 is arranged in the center part near the upper surface of the body 10 above the flock separating chamber 12, same being provided in the side wall thereof with a number of openings 38 connected with the uppermost part of the coagulating reaction chamber 17 and connected in the lower part with a purified water overflow pipe 32 opening outside the body 10 through the side wall thereof.

The sludge settling chamber 27 is sealed in the bottom part and is provided in the side wall with a sludge discharging pipe 28 having a valve C. The arrows A and B represent respectively the crude water inlet and the purified water outlet.

OPERATION

The operation of the apparatus of the present invention formed as mentioned above for purifying water shall be explained in detail.

Crude water, to which a proper amount of a coagulant has been added, passes through the crude water inlet pipe 29 and has its velocity multiplied several times by the inflow water being accelerated through the nozzle 30, the water thus forming a jet which rises vertically through the jet diffuser 18 and enters the quick agitating reaction chamber 19. In such case, the water in the sludge settling chamber 27 will also rise due to the attracting action of the jet. By this attracted rising current, circulating currents will be produced through the external downward flow pipes 16 between the sludge settling chamber 27 and the flock separating chamber 12 and, further, circulating currents will also be produced between the upper part of the coagulating reaction chamber 17 and the sludge settling chamber 27 through the internal downward flow passage 34 in the center part of the tower 10.

At the time of starting the operation, air enclosed in the quick agitating reaction chamber 19 is pushed out through the air exhausting pipe 31. After the completion of this operation, the air exhausting port valve D is closed. The crude water is then mixed with a coagulant in the quick agitating reaction chamber 19, passes through the jetting pipes 22, has its velocity increased by the secondary nozzles 24 bent in the same direction respectively at the tips of the jetting pipes, flows into the quick rotating chamber 36 and further flows into the lower part of the coagulating reaction chamber 17 while making quick rotating currents. Here, it rises while making rotating currents, eddy currents and turbulences.

While rotating and rising through said chamber 17, the flocks will contact and combine with one another to form large flocks and will rise. As they progressively rise, the eddy currents and turbulences will vanish and only the rotating rising currents will remain in the flow phase. The flocks floating in this flow will rotate and rise while collecting as if pushed against the inner peripheral surface of the coagulating reaction chamber 17 by the centrifugal force produced by the rotating currents. At the same time, fine flocks will be attracted inwardly by the centripetal force produced so as to flow down through the internal downward flow passage 34, which flocks will pass through said passage 34 and will precipitate in the sludge settling chamber 27. On the other hand, the flocks rotating and rising along the inner peripheral wall of the coagulating reaction chamber 17 will pass through the flow slots 15 into the flock separating chamber 12, and will then pass through the external downward flow pipes 16 and together with the circulating water will precipitate in the sludge settling chamber 27 and will be discharged by gravity through the sludge discharging pipe 28 by opening the sludge discharging valve C at a proper time.

On the other hand, the treated water attracted upwardly toward the flock separating chamber 12 and having had the flocks removed will further rise while making rotating currents and flow into the purified water collecting box 37 through the openings 38. The purified water is then discharged through the outlet pipe 32 and flows outwardly through the purified water outlet B.

Thus, according to the present invention, rotating rising currents are produced without using any mechanical agitator in the coagulating reaction chamber. The coagulated floating flocks are then collected on the peripheral wall of the reaction chamber by their centrifugal force and are separated and removed. Further, fine flocks are attracted, separated and removed by producing a centripetal force in the center part of the reaction chamber. Thus, the crude water introduced from the lower part of the reaction chamber overflows from the top part as purified water and the sludge settles into the lower part of the reaction chamber and is separated and removed.

In the present invention, as mentioned above, quite irrespective of the flock settling velocity, if only flocks are formed, they will be able to be quickly separated by the centrifugal force or centripetal force produced by the rotating currents in the apparatus. Therefore, the water purifying capacity is very large. For example, whereas the water purifying capacity of a conventional apparatus is less than 3.5 m.$^3$/hr./m.$^2$, under the same conditions the present invention can develop a capacity of more than 20 m.$^3$/hr./m.$^2$. Further, neither a coagulating assistant or an auxiliary device is required.

What I claim is:

1. In an apparatus for treating a liquid, the combination comprising:
    an outer tank body;
    a material solution feeding pipe extending upwardly in a central region of the outer tank body at the bottom thereof;
    a tubular body extending upwardly in said outer tank body above said feeding pipe and having a first flow passageway means therethrough;

an inner cylinderical body surrounding said tubular body and defining therewith a first upright narrow flow zone which is open at its upper end, the bottom part of said inner cylindrical body being secured to said tubular body;

an outer cylindrical body surrounding said inner cylindrical body and defining with said inner cylindrical body a second upright narrow flow zone which is open at both ends, said outer cylindrical body further defining with said outer tank body an upright cylindrical reaction chamber therebetween;

a plurality of liquid flow jetting ports comprising a plurality of nonradially directed nozzles adjacent the lower end of the inner cylindrical body, said nozzles having axes which extend at least in part horizontally for directing liquid in a generally circumferential direction around the periphery of said reaction chamber; and chamber means positioned adjacent the bottom of said outer tank body and having an opening therein for permitting communication between said chamber means and said first flow passageway means; and second flow passageway means connecting the outer periphery of said reaction chamber to said chamber means.

2. An apparatus as defined in claim 1, further including:

third passageway means interconnecting the central region of said reaction chamber to said chamber means, said third passageway means being defined by said first flow zone with the upper end thereof opening into said reaction chamber and the lower end thereof being in communication with said chamber means.

3. An apparatus as defined in claim 1, wherein:

said second passageway means has an inlet opening at one end thereof in communication with the outer periphery of said reaction chamber adjacent the upper region thereof, said second passageway means further having an outlet opening at the other end thereof in communication with said chamber means, said inlet opening being substantially vertically spaced above said outlet opening.

4. An apparatus as defined in claim 1, further including:

an annular body concentric with and positioned adajacent the upper end of said outer tank body and defining therebetween a fluid chamber;

wall means separating said fluid chamber from said reaction chamber, said wall means having a plurality of elongated openings therein for permitting communication therebetween; and said second flow passageway means being directly in communication with said fluid chamber.

5. An apparatus as defined in claim 4, wherein:

third passageway means interconnecting the central region of said reaction chamber to said chamber means, said third passageway means being defined by said first flow zone with the upper end thereof opening into said reaction chamber and the lower end thereof being in communication with said chamber means.

6. An apparatus as defined in claim 1, further including:

an inner tank body positioned within said outer tank body adjacent the upper end thereof, said inner tank body being positioned above said inner and outer cylindrical members and defining therein a further fluid chamber, and said inner tank body having openings in the wall thereof for permitting communication between said further fluid chamber and the upper region of said reaction chamber.

7. An apparatus as defined in claim 1, further including:

an annular skirt member positioned within said outer tank member in surrounding relationship with and fixedly secured to said outer cylindrical member, said skirt member defining a circular flow zone in communication with said reaction chamber, said annular member having an upper wall positioned above said nozzles and an annular cylindrical wall in surrounding relationship to said nozzles.

8. An apparatus as defined in claim 1, wherein:

said material feed pipe has the outlet end thereof positioned adjacent the inlet end to said tubular body with the outlet end of said feed pipe having a nozzle formed thereon; and the nozzle on said feed pipe being concentrically positioned within and extending through the opening providing communication between said chamber means and the inlet end of said tubular body, said opening being larger than said nozzle whereby flow of fluid through said nozzle additionally causes fluid from said chamber means to flow into said tubular body.

References Cited

UNITED STATES PATENTS 1,837,191   12/1931   Baldwin _____ 210—512
3,306,449   2/1967   Minegishi _____ 210—197 X JAMES L. DECESARE, Primary Examiner U.S. Cl. X.R.

210—512, 519